(No Model.)

H. W. WALLIS.
PROCESS OF MAKING CHLORIN.

No. 537,508. Patented Apr. 16, 1895.

Witnesses
A. N. Dobson
G. P. Kramer

Inventor
Henry Weston Wallis
by Foster Freeman
atty

UNITED STATES PATENT OFFICE.

HENRY WESTON WALLIS, OF LONDON, ENGLAND.

PROCESS OF MAKING CHLORIN.

SPECIFICATION forming part of Letters Patent No. 537,508, dated April 16, 1895.

Application filed December 6, 1892. Serial No. 454,267. (No specimens.) Patented in England July 15, 1892, No. 13,047.

*To all whom it may concern:*

Be it known that I, HENRY WESTON WALLIS, a subject of the Queen of England, residing at London, England, have invented certain new and useful Improvements in the Manufacture of Chlorin, (for which I have received Letters Patent of Great Britain No. 13,047, dated July 15, 1892,) of which the following is a specification.

My invention consists in an improved process of manufacturing chlorin from the three aqueous acids, hydrochloric, nitric and sulfuric.

I am aware that others have proposed to produce chlorin working with the same materials, as for instance Donald in his British specifications, Nos. 62, dated January 3, 1887, and 5,488, dated April 11, 1890, and Davis, Nos. 6,416, dated April 28, 1890, and 6,831, dated May 3, 1890. I differ from both of them collectively in this, that I alone use hydrochloric acid in the aqueous state, and I differ from them individually in my method of after treatment for the more or less complete conversion of the whole of the hydrochloric acid into chlorin.

My process is as follows: I cause sulfuric acid, hot or cold, and aqua regia either as such, or nitric and aqueous hydrochloric acid without previously mixing them so as to form aqua regia, to flow down a suitably packed tower or column so as to produce an intimate mixture of them, with agitation or by flowing in films in such a way as to readily release the chlorin formed thereby, or I place sulfuric acid, hot or cold, in a vessel, and either drop into it from above, or pass into it from below a solution of nitro-hydrochloric acid, otherwise called aqua regia; or I reverse this order by placing the aqua regia in the vessel and passing into it from above or below, sulfuric acid, hot or cold, or I place sulfuric and nitric acids together into the vessel and introduce into it aqua regia, or aqueous hydrochloric acid only; and as a final alternative I run all three acids simultaneously into the vessel in due proportions. The method I prefer, however, is as follows, and it will be best understood by reference to the accompanying drawings, in which—

Figure 1:
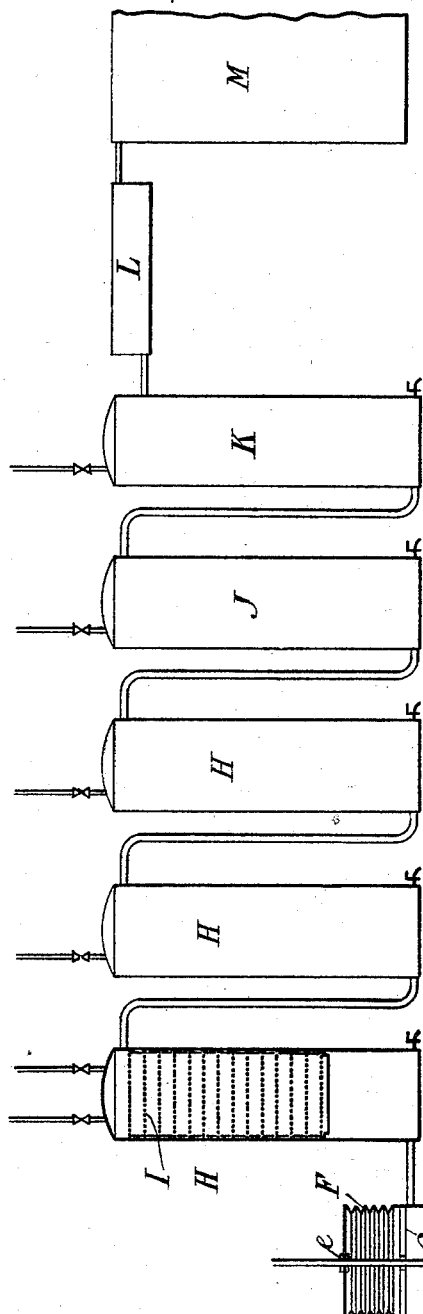
Figure 2:
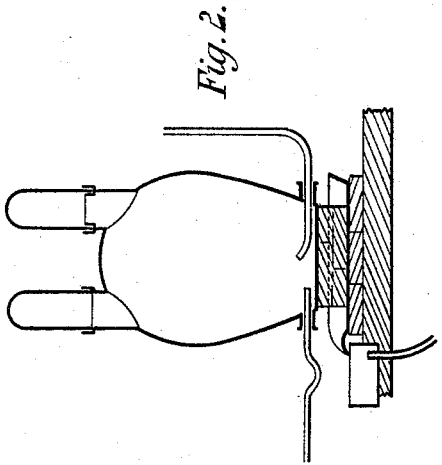

Figure 1, is a diagrammatic view of a plant I have found suitable for my purpose, and Fig. 2, a vertical section of a de-nitrator.

Sulfuric acid is fed into the decomposer A, from a vessel B, and into this decomposer either from above or below, I introduce from one or more vessels C, hydrochloric and nitric acids either separately (but simultaneously), or previously mixed as aqua regia. I find agitation to be of considerable service, and this is partly effected by the introduction into the decomposer of my liquid or liquids from below. Mechanical agitation further promotes the disengagement of the gases and this may be conveniently effected either by a revolving vane-wheel inside the liquid or by a plunger consisting of a perforated disk D, carried on the end of a rod E. The plunger is worked up and down in the decomposer, thereby causing a violent disturbance of the mixed liquids. The rod E, passes to the exterior of the decomposer A, and is rigidly attached at e, to an air-tight bellows-like structure F, preferably made of india-rubber and the other end of which is air-tightly secured to the mouth of the decomposer.

The bellows-like structure F, allows the rod E, moving in the guides O, to travel up and down in the decomposer without the possibility of any loss of gas.

The decomposer may very conveniently be made of lead, as this substance is infinitesimally attacked by the mixed acids and their products, and is very serviceable for the outward application of heat. No heat is necessarily applied at first, but at the end when the re-action has slackened, heat to 105° centigrade applied at G, is sufficient to eliminate the last traces of chlorin. The theory of the chemical changes taking place in the successive steps of my process, is based upon well-known re-actions to be found in most scientific works of reference. They may be summed up in the following equations:

First. For production of chlorin and nitrosyl chlorid as taking place partly in the decomposer and partly in the first absorber

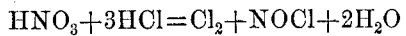

Second. For the conversion of nitrosyl chlorid into chlorin, which also takes place partly in the decomposer and partly in the first absorber $$4NOCl + 2HNO_3 = 2Cl_2 + 3N_2O_3 + H_2O$$

Third. The conversion of nitrosyl chlorid (a) and of nitrous anhydride (b) into nitrous vitriol, otherwise called nitrosyl sulfate (a) $NOCl + H_2SO_4 = NOHSO_4 + HCl$
(b) $N_2O_3 + 2H_2SO_4 = 2NOHSO_4 + H_2O$ Fourth. The denitration of the nitrous vitriol by means of water and air; and separation of nitric and sulfuric acid $$2NOHSO_4 + O_2 + 2H_2O = 2H_2SO_4 + 2HNO_3$$

Whatever procedure I adopt the after treatment of the evolved gases is the same in all cases. Chlorin and nitrosyl chlorid are the invariable products of the decomposition. These are led through sulfuric acid contained in vessels H, provided with plate columns I, hereinafter called absorbers, which does not affect the chlorin but decomposes the nitrosyl chlorid into nitrous vitriol and hydrochloric acid. This hydrochloric acid may be directly recovered for re-use, but I find it advantageous to have an excess of nitric acid either (a) before introduction into the decomposer, or (b) with the sulfuric acid which is in the decomposer, or (c) with the sulfuric acid in the first absorber, or in any pair of these, viz: in a and b, or in a and c, or in b and c, or in all three, viz: in a and b and c. By this means the hydrochloric acid above mentioned as undecomposed, can now be decomposed in whole or in part, as desired, according to the quantity of additional nitric acid taken. The products of the decomposition are the same. Finally the gas is washed with aqueous hydrochloric acid in the vessel J, to free it from any oxides of chlorin that may have formed, and then with a small quantity of water in the vessel K, after which it is ready for use.

In the process of manufacture the nitrous vitriol is denitrated by ordinary means, and the nitric acid is recovered and used again. The sulfuric acid is also recovered and re-used.

I do not employ any new method of denitration, but I may use any of the long-established processes set forth in Professor Lunge's work on sulfuric acid and alkali, Vol. I, Ed. 1891, pp. 559 to 603. At the same time I have found that my weak nitrous vitriol from the decomposer may well and easily be denitrated, and the sulfuric acid also to a large extent be reconcentrated in the well known Glover tower. The nitrous vitriol in the absorbers, being of much higher strength and specific gravity is better denitrated in steam columns, cascades or Woulff's bottles as set forth by Lunge and I have shown in Fig. 2, the simplest of these forms of denitrators which corresponds with figure 223, page 568, of Lunge's work above referred to.

To obtain eight hundred-weight of chlorin and therefrom one ton of bleaching powder from a set of charges, I require about 10.11 hundred-weight of aqueous nitric acid of seventy per cent.; and about twenty-six hundred-weight of aqueous hydrochloric acid of 1.157 specific gravity equals 31.7 per cent. HCl or proportionate quantities of other strengths. This forms my aqua regia, and either to this or the decomposer or the first absorber or to any pair of these, or to all three half as much more nitric acid, viz: 5.054 hundred-weight may be added if it is required to obtain more than two-thirds of the chlorin.

The proportion of sulfuric acid required is in the decomposer about three tons of strong acid of 168° Twaddle; or about three and one-half tons of acid of 142° or 152° Twaddle. Less than these quantities may be used without detriment to the production of chlorin, but then the sulfuric acid has to be reconcentrated, through a larger range of hydrometric degrees. The proportion of sulfuric acid required for absorption per ton of bleach is about twenty-eight and one-half hundred-weight or less, of specific gravity 168° Twaddle.

I wish it to be understood although for the purpose of a better understanding of my invention I have shown and described a suitable apparatus or plant, that I lay no claim whatsoever on this apparatus, but—

What I claim is—

1. In the process substantially as hereinbefore described of manufacturing chlorin, the oxidation of the nitrosyl chlorid by subjecting it to the action of an excess of nitric acid in sulfuric acid.

2. The process substantially as hereinbefore described of manufacturing chlorin from aqueous acids, which consists in decomposing aqua regia in the presence of sulfuric acid, and passing the products of the decomposition through sulfuric acid.

In testimony whereof I have hereto set my hand in the presence of the two subscribing witnesses.

HENRY WESTON WALLIS.

Witnesses:
ARCHIBALD BRUND,
HAROLD WADE.